US012528330B2

(12) United States Patent
She et al.

(10) Patent No.: US 12,528,330 B2
(45) Date of Patent: Jan. 20, 2026

(54) TRANSPORT REFRIGERATION SYSTEM HAVING DIRECT CURRENT POWER SOURCES

(71) Applicant: Carrier Corporation, Palm Beach Gardens, FL (US)

(72) Inventors: Xu She, Cohoes, NY (US); HanJong Kim, Avon, CT (US); Mark Makwinski, Cromwell, CT (US); Bart Antonie van Hassel, Weatogue, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 274 days.

(21) Appl. No.: 18/174,148

(22) Filed: Feb. 24, 2023

(65) Prior Publication Data

US 2023/0271476 A1    Aug. 31, 2023

Related U.S. Application Data

(60) Provisional application No. 63/314,630, filed on Feb. 28, 2022.

(51) Int. Cl.
*B60H 1/00* (2006.01)
*B60H 1/32* (2006.01)

(52) U.S. Cl.
CPC ....... *B60H 1/00428* (2013.01); *B60H 1/3205* (2013.01); *B60H 1/3232* (2013.01)

(58) Field of Classification Search
CPC .............. B60H 1/00428; B60H 1/3205; B60H 1/3232; B60H 1/00364; B60H 1/32; Y02T 10/88; B60R 16/03; B60P 3/20
See application file for complete search history.

(56) References Cited

U.S. PATENT DOCUMENTS

| 10,018,399 B2 | 7/2018 | Rusignuolo et al. |
| 10,240,847 B1 | 3/2019 | Thomas, Jr. |
| 10,377,209 B2 * | 8/2019 | Kolda et al. .......... F25B 43/006 |
| 10,823,476 B2 | 11/2020 | Chopko et al. |

(Continued)

FOREIGN PATENT DOCUMENTS

| CN | 201434553 Y | 3/2010 |
| CN | 101909924 B | 4/2013 |

(Continued)

OTHER PUBLICATIONS

WO 2021244832 A1 Translation (Year: 2021).*

(Continued)

*Primary Examiner* — Jerry-Daryl Fletcher
*Assistant Examiner* — Dario Antonio Deleon
(74) *Attorney, Agent, or Firm* — CANTOR COLBURN LLP (57) ABSTRACT

A transport refrigeration system includes a transport refrigeration unit configured to provide conditioned air to a refrigerated cargo space of a container; a low voltage DC power source including a fuel cell configured to provide electricity to the transport refrigeration unit; a power converter configured to condition DC power from the low voltage DC power source prior to supply to a transport refrigeration unit load; and a power management module configured to manage power provided to the transport refrigeration unit.

10 Claims, 9 Drawing Sheets

(56) References Cited

U.S. PATENT DOCUMENTS

| | | |
|---|---|---|
| 11,118,833 B2 | 9/2021 | Poolman et al. |
| 11,135,893 B2 | 10/2021 | Rydkin et al. |
| 2011/0162395 A1* | 7/2011 | Chakiachvili et al. .................... B60H 1/3226 62/115 |
| 2013/0000342 A1 | 1/2013 | Blasko et al. |
| 2014/0026599 A1* | 1/2014 | Bushnell et al. ..... F25B 49/025 62/56 |
| 2017/0373333 A1 | 12/2017 | Kajiura et al. |
| 2021/0203217 A1* | 7/2021 | Donnellan et al. .. B60H 1/3232 |
| 2021/0260954 A1 | 8/2021 | Saroka et al. |
| 2021/0260964 A1 | 8/2021 | Saroka et al. |
| 2021/0268876 A1 | 9/2021 | Van Wijk |

FOREIGN PATENT DOCUMENTS

| | | | |
|---|---|---|---|
| DE | 102012103597 A1 * | 10/2013 | ......... B60H 1/00428 |
| EP | 3626488 A1 | 3/2020 | |
| EP | 2897824 B1 | 6/2020 | |
| IN | 101695912 B | 9/2012 | |
| WO | WO 2021244832 A1 * | 12/2021 | ........... B60H 1/3232 |

OTHER PUBLICATIONS

DE 102012103597 A1 Translation (Year: 2013).*
European Search Report for Application No. 23158542.3, Issued Sep. 1, 2023, 7 Pages.

* cited by examiner

FIG. 9

TRANSPORT REFRIGERATION SYSTEM HAVING DIRECT CURRENT POWER SOURCES

CROSS-REFERENCE TO RELATED APPLICATIONS

This applications claims the benefit of U.S. Provisional Application No. 63/314,630, filed Feb. 28, 2022, all of which are incorporated herein by reference in their entirety.

BACKGROUND

The embodiments disclosed herein generally relate to transport refrigeration systems and more specifically, to transport refrigeration systems having direct current power sources.

Refrigerated vehicles and trailers are commonly used to transport perishable goods. A transport refrigeration unit (TRU) is commonly mounted to the vehicle or to the trailer in operative association with a cargo space defined within the vehicle or trailer for maintaining a controlled temperature environment within the cargo space.

Conventionally, transport refrigeration units used in connection with refrigerated vehicles and refrigerated trailers include a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On many commercially available transport refrigeration units the compressor, and typically other components of the transport refrigeration unit, is powered during transit by a prime mover, either through a direct mechanical coupling or a belt drive. Alternatively, the transport refrigeration unit may be electrically powered (e.g., using an alternating (AC) synchronous generator that generates AC power). The generated AC power is typically used to power an electric motor for driving the refrigerant compressor, and other components of the transport refrigeration unit.

Traditional transport refrigeration units feature high voltage AC components (e.g. generators, compressors, fans, etc.) which are not ideally suited to be directly powered by the lower voltage direct current (DC) power sources. Such systems require significant electrical conversions (and their associated required hardware) to obtain the sustainability benefits of DC power sources, as compared to conventional diesel engine powered generators.

BRIEF DESCRIPTION

According to one embodiment, a transport refrigeration system includes a transport refrigeration unit configured to provide conditioned air to a refrigerated cargo space of a container; a low voltage DC power source comprising a fuel cell configured to provide electricity to the transport refrigeration unit; a power converter configured to condition DC power from the low voltage DC power source prior to supply to a transport refrigeration unit load; and a power management module configured to manage power provided to the transport refrigeration unit.

In addition to one or more of the features described above, or as an alternative, further embodiments of may include wherein the low voltage DC power source includes one or more supplemental power sources configured to provide supplemental electricity to the transport refrigeration unit.

In addition to one or more of the features described above, or as an alternative, further embodiments of may include wherein the one or more supplemental power sources comprises: an energy storage device configured to store electricity and provide electricity to the transport refrigeration unit; and an electric generation device configured to generate electricity and provide the electricity to the transport refrigeration unit.

In addition to one or more of the features described above, or as an alternative, further embodiments of may include wherein the one or more supplemental power sources comprises an energy storage device configured to store electricity and provide electricity to the transport refrigeration unit.

In addition to one or more of the features described above, or as an alternative, further embodiments of may include wherein the energy storage device comprises at least one of a battery system, a capacitor, or a thermal storage system.

In addition to one or more of the features described above, or as an alternative, further embodiments of may include wherein the one or more supplemental power sources comprises an electric generation device configured to generate electricity and provide the electricity to the transport refrigeration unit.

In addition to one or more of the features described above, or as an alternative, further embodiments of may include wherein the electric generation device comprises at least one of a small assist internal combustion engine generator, an axle generator, a hub generator or a solar panel.

In addition to one or more of the features described above, or as an alternative, further embodiments of may include wherein the power converter comprises: a low voltage inverter connected to an output of the low voltage DC power source; a low frequency transformer connected to an output of the low voltage inverter; an output of the low frequency transformer connected to the transport refrigeration unit load.

In addition to one or more of the features described above, or as an alternative, further embodiments of may include wherein the power converter comprises: a high frequency transformer isolated DC-DC converter connected to an output of the low voltage DC power source; a high voltage inverter connected to an output of the high frequency DC-DC converter; an output of the high voltage inverter connected to the transport refrigeration unit load.

In addition to one or more of the features described above, or as an alternative, further embodiments of may include wherein the power converter comprises: a low voltage, medium frequency inverter connected to an output of the low voltage DC power source; a medium frequency transformer connected to an output of the low voltage, medium frequency inverter; an AC-AC converter connected to an output of the medium frequency transformer; an output of the AC-AC converter connected to the transport refrigeration unit load.

In addition to one or more of the features described above, or as an alternative, further embodiments of may include wherein the power converter comprises: a low voltage inverter connected to an output of the low voltage DC power source; a low frequency transformer connected to an output of the low voltage inverter; an output of the low frequency transformer connected to the transport refrigeration unit load; an output of the low voltage DC power source connected to a second transport refrigeration unit load.

In addition to one or more of the features described above, or as an alternative, further embodiments of may include wherein the power converter comprises: a low voltage, medium frequency inverter connected to an output of the low voltage DC power source; a medium frequency transformer connected to an output of the low voltage, medium frequency inverter; an AC/DC/AC converter connected to an output of the medium frequency transformer; an AC output of the AC/DC/AC converter connected to the transport refrigeration unit load; a DC output of the AC/DC/AC converter connected to a second transport refrigeration unit load; an output of the low voltage DC power source connected to a third transport refrigeration unit load.

In addition to one or more of the features described above, or as an alternative, further embodiments of may include wherein the power converter comprises: a high frequency transformer isolated DC-DC converter connected to an output of the low voltage DC power source; a high voltage inverter connected to an output of the high frequency DC-DC converter; an output of the high voltage inverter connected to the transport refrigeration unit load; an output of the high frequency transformer isolated DC-DC converter connected to a second transport refrigeration unit load; an output of the low voltage DC power source connected to a third transport refrigeration unit load.

According to another embodiment, a transport refrigeration system includes a transport refrigeration unit configured to provide conditioned air to a refrigerated cargo space of a container, the transport refrigeration unit having a transport refrigeration unit load; a low voltage DC power source comprising a fuel cell configured to provide electricity to the transport refrigeration unit; wherein the low voltage DC power source is directly connected to the transport refrigeration unit load.

Technical effects of embodiments of the present disclosure include powering a transport refrigeration system with one or more direct current power sources.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
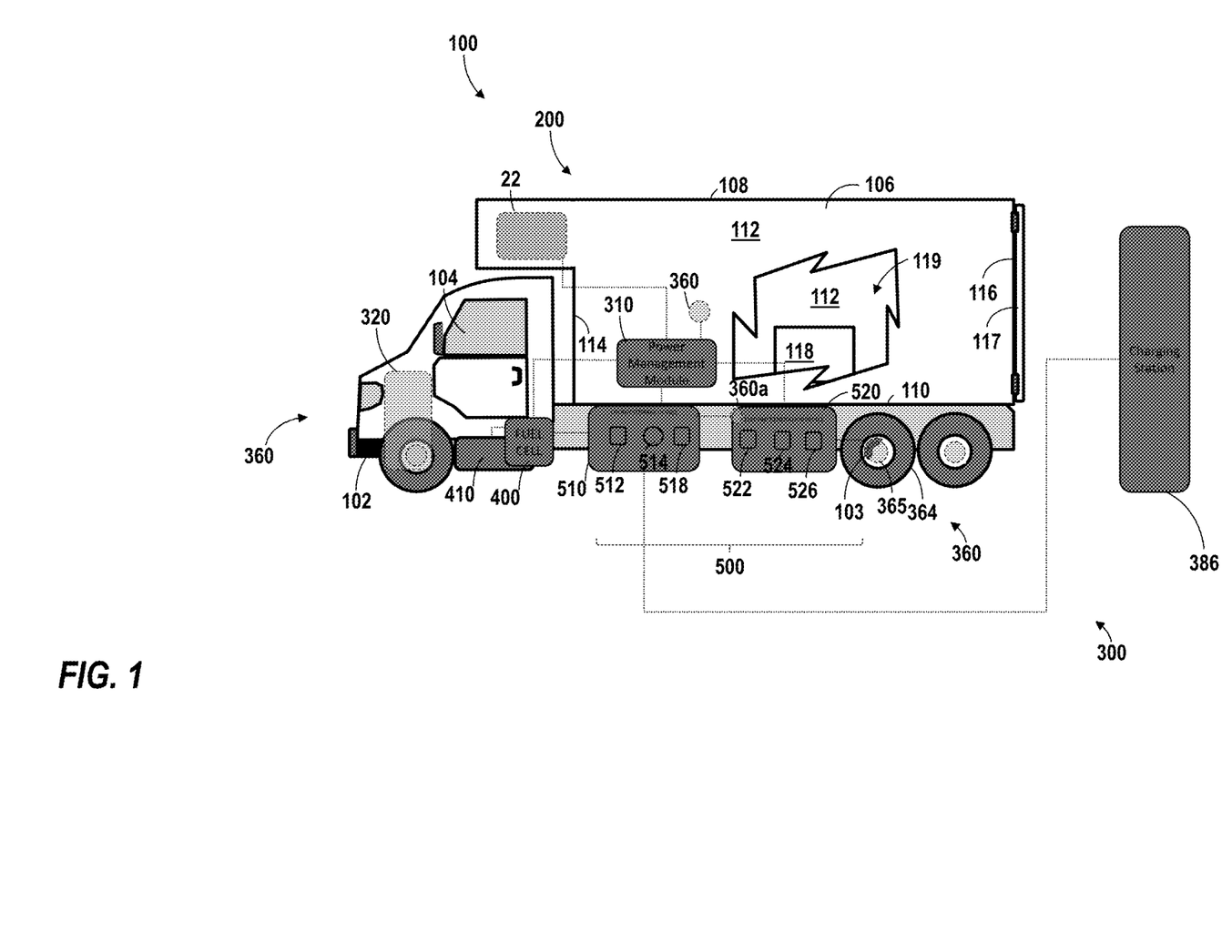
FIG. 1 is a schematic illustration of an exemplary transport refrigeration system, according to an embodiment of the present disclosure.
Figure 2:
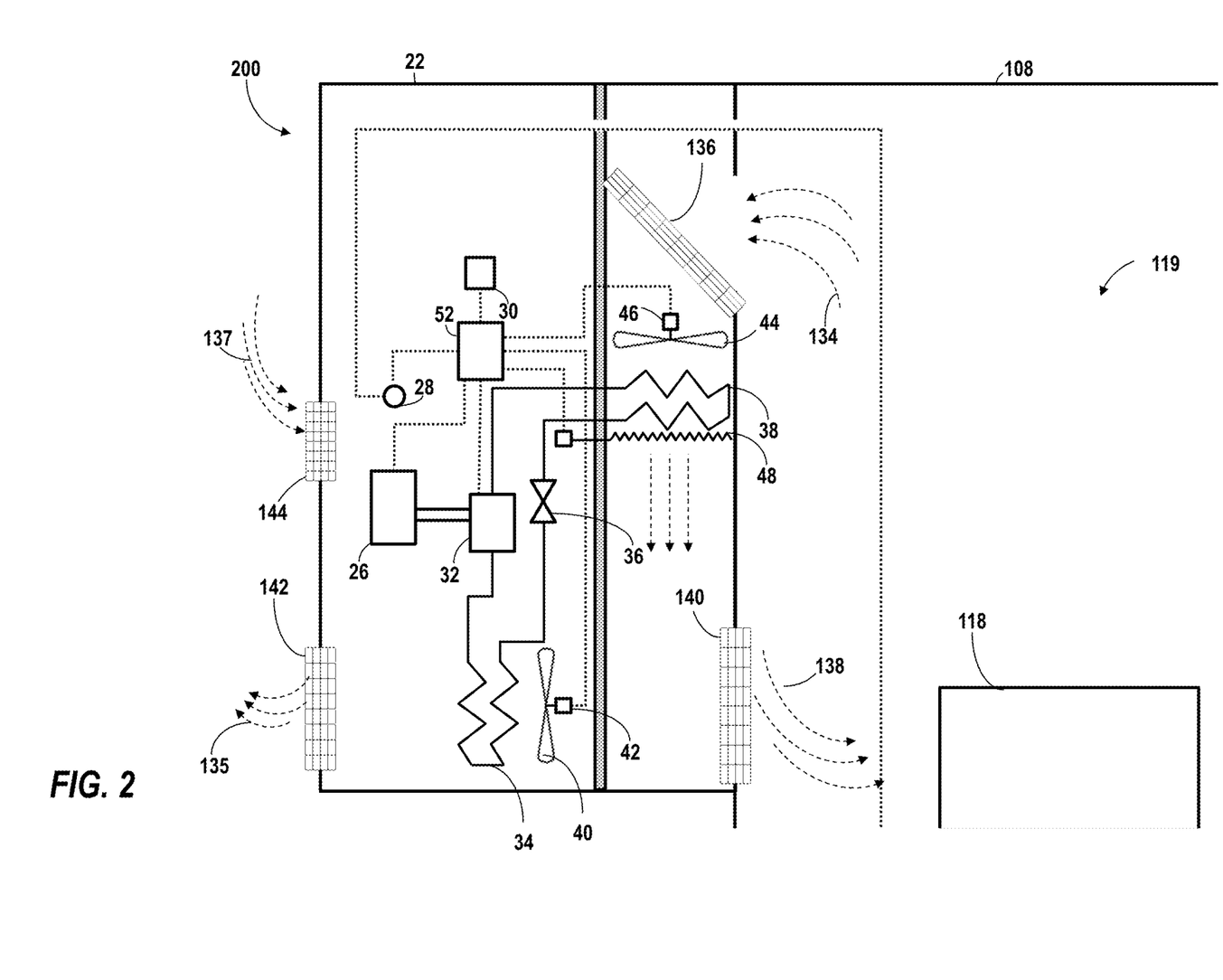
FIG. 2 is an enlarged schematic illustration of an exemplary transport refrigeration unit of the transport refrigeration system of FIG. 1, according to an embodiment of the present disclosure.

Embodiments disclosed herein relate to powering a transport refrigeration unit with one or more DC power sources. Referring to FIGS. 1 and 2, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure.

The transport refrigeration system 200 is illustrated as a transportation system 100, as seen in FIG. 1. The transportation system 100 includes a vehicle 102 integrally connected to a transport container 106. The vehicle 102 includes an operator's compartment or cab 104 and a propulsion motor 320 which acts as the drive system of the transportation system 100. The propulsion motor 320 is configured to power the vehicle 102. The energy source that powers the propulsion motor 320 may be at least one of compressed natural gas, liquefied natural gas, gasoline, electricity, diesel, fuel cell, or any combination thereof. The propulsion motor 320 may be an electric motor or a hybrid motor (e.g., a combustion engine and an electric motor). The transport container 106 is coupled to the vehicle 102. The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to a tractor-trailer refrigerated system or non-trailer refrigeration such as, for example a rigid truck, a truck having refrigerated compartment, and/or shipping containers having a cargo space.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. Referring to FIG. 2, the transport refrigeration system 200 includes a transport refrigeration unit 22, a refrigerant compression device 32, an electric motor 26 for driving the refrigerant compression device 32, and a controller 30. The transport refrigeration unit 22 is in operative association with the refrigerated cargo space 119 and is configured to provide conditioned air to the transport container 106. The transport refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the refrigerated cargo space 119, as known to one of ordinary skill in the art. In an embodiment, the transport refrigeration unit 22 is capable of providing a desired temperature and humidity range.

The transport refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The transport refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The transport refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the transport refrigeration unit 22 is operating in a subcritical refrigerant cycle or as a refrigerant gas cooler, such as if the transport refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air intake 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat absorption heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerate cargo space 119 of the transport container 106 by means of the transport refrigeration unit 22. A return airflow 134 flows into the transport refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140. Heat 135 is removed from the refrigerant heat rejection heat exchanger 34 through the heat outlet 142. The transport refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106. It is to be appreciated that the transport refrigeration unit 22 can further be operated in reverse to warm the transport container 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the transport refrigeration unit 22.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the electric motor 26. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium. Information obtained by the controller 30 may be uploaded to a data management system through telematics.

Referring to FIG. 1, the transport refrigeration unit 22 is powered by one or more DC power sources, including, but not limited to a fuel cell 400 and/or one or more supplemental DC power sources 500.

The fuel cell 400 may include an anode electrode and a cathode electrode separated by an electrolyte (not shown for simplicity). A reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a catalyst surface of the anode electrode to produce hydrogen ions and electrons. The electrons are conducted to an external load circuit (e.g., the transport refrigeration unit 22 or energy storage device 510) and then returned to the cathode electrode, while the hydrogen ions transfer through the electrolyte to the cathode electrode, where they react with the oxidant and electrons to produce water and release thermal energy. A fuel tank 410 is configured to store and provide the reducing fluid to the fuel cell 400. In an embodiment, the reducing fluid is hydrogen. In one embodiment, the fuel cell 400 and fuel tank 410 may be located outside of the transport refrigeration unit 22, as shown in FIG. 1.

In one embodiment, the one or more supplemental power sources 500 may be located outside of the transport refrigeration unit 22, as shown in FIG. 1. In another embodiment, the one or more supplemental power sources 500 may be located within the transport refrigeration unit 22. The one or more supplemental power sources 500 may include an energy storage device 510 and/or an electric generation device 520. The fuel cell 400 may power the transport refrigeration unit 22 directly or may provide electricity to an energy storage device 510, which then provides power to the transport refrigeration unit 22.

The energy storage device 510 may include a battery system 512, a capacitor 514, a thermal storage system 518, and/or any other electricity storage system known to one of skill in the art. The battery system 512 may comprise, chemical batteries, lithium-ion batteries, solid state batteries, flow batteries, or any other type of battery known to one of skill in the art. The battery system 512 may employ multiple batteries organized into battery banks. The capacitor 514 may be an electrolytic capacitor, a mica capacitor, a paper capacitor a film capacitor, a non-polarized capacitor, a ceramic capacitor, or any type of capacitor known to one of skill in the art. The thermal storage system 518 may be configured to absorb heat through electrical chemical or phase change material for later energy extraction.

The electricity generated by the electric generation device 520 may charge the energy storage device 510 or directly power the transport refrigeration unit 22. The electric generation device 520 may include axle generator 524, hub generator 526, and/or any other electricity generation system (e.g., solar panels on the exterior of top wall 108) known to one of skill in the art.

The axle generator 524 is configured to recover rotational energy when the transport refrigeration system 20 is in motion and convert that rotational energy to electrical energy, such as, for example, when the axle 365 of the transportation system 100 is rotating due to acceleration, cruising, or braking. The axle generator 524 may be mounted on or operably connected to a wheel axle 365 of the transportation system 100. It is understood that the axle generator 524 may be mounted on any axle 365 of the transportation system 100 and the mounting location of the axle generator 524 illustrated in FIG. 1 is one example of a mounting location. The axle generator 524 may be operably connected to the axle 365 through at least one mechanical linkage, such as, for example a drive shaft, belt system, or gear system. The mechanical linkage configured to rotate the axle generator 524 as the axle 365 rotates when the axle generator 524 is activated. The axle generator 524 may comprise a DC generator configured to generate direct current (DC) power at at least one voltage.

The hub generator 526 is configured to recover rotational energy when the transport refrigeration system 20 is in motion and convert that rotational energy to electrical energy, such as, for example, when the wheel 364 of the transportation system 100 is rotating due to acceleration, cruising, or braking. The hub generator 526 may be mounted on a wheel 364 of the transportation system 100. It is understood that the hub generator 526 may be mounted on any wheel 364 of the transportation system 100 and the mounting location of the hub generator 526 illustrated in FIG. 1 is one example of a mounting location. The hub generator 526 may be operably connected to the wheel 364 through at least one mechanical linkage, such as, for example a drive shaft, belt system, or gear system. The mechanical linkage configured to rotate the hub generator 526 as the wheel 364 rotates when the hub generator 526 is activated. The hub generator 526 may comprise a DC generator configured to generate direct current (DC) power at at least one voltage.

An inertial sensor 360 may be present and configured to detect at least one of a deceleration of the vehicle 102 and a downward pitch of the vehicle 102 (e.g., indicating the vehicle 102 is moving downhill). The inertial sensor 360 may be a 5-axis sensor. The inertial sensor 360 may be configured to detect three linear accelerations and two rotational accelerations. The three linear accelerations may be along an X-axis, a Y-axis, and a Z-axis of a three-dimensional Cartesian coordinate system. The rotational accelerations may be around two of the three axis of the three-dimensional cartesian coordinate system, such as, for example, the X-axis and the Z-axis. The inertial sensor 360 may accomplish this detection utilizing a plurality of connected sensors or a single sensor. In an embodiment, the inertial sensor 360 is a single sensor in electronic communication with a power management module 310. The power management module 310 is configured to activate the axle generator 524 and/or the hub generator 526 when the inertial sensor 360 detects at least one of the deceleration of the vehicle 102 and the downward pitch of the vehicle 102. The inertial sensor 360 may also include a GPS device in order to predict in advance at least one of the deceleration of the vehicle 102 and the downward pitch of the vehicle 102.

The energy storage device 510 may be charged by a stationary charging station 386 such as, for example a wall 480V AC power outlet.

The transport refrigeration unit 22 has a plurality of electrical power demand loads on the energy storage device 510, including, but not limited to, the electric motor 26 for the compression device 32, the drive motor 42 for the fan 40 associated with the refrigerant heat rejection heat exchanger 34, and the drive motor 46 for the fan 44 associated with the refrigerant heat absorption heat exchanger 38, the heater 48 and the controller 30. As each of the fan motors 42, 46 and the electric motor 26 may be an AC motor or a DC motor, it is to be understood that various power converters 52, such as AC to DC rectifiers, DC to AC inverters, sine filters, AC to AC voltage/frequency converters, and DC to DC voltage converters, and relative filters may be employed in connection with the energy storage device 510 as appropriate. The transport refrigeration system 200 may also include a voltage sensor 28 to sense the voltage coming into the transport refrigeration unit 22.

The power demand loads of the transport refrigeration unit 22 may be managed and fulfilled by an energy management system 300. The energy management system 300 may include the fuel cell 400 and/or the one or more supplemental power sources 500. The energy management system 300 includes a power management module 310 that is in communication with transport refrigeration unit 22, the fuel cell 400 and/or the one or more supplemental power sources 500.

The power management module 310 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium. The power management module 310 may be implemented by the controller 30.

The power management module 310 is configured to control electricity to transport refrigeration unit 22 from one or more the DC power sources including the fuel cell 400 and the one or more supplemental power sources 500.

The power management module 310 may also be in communication with the inertial sensor 360 if present. The inertial sensor 360 is configured to detect a deceleration of the vehicle 102. The inertial sensor 360 is in operative association with the vehicle 102 and may detect when a brake 103 of the vehicle 102 is being applied to slow the vehicle 102 and/or the vehicle 102 is decelerating without the brakes 103 being applied (i.e., driver lets foot off accelerator pedal). The inertial sensor 360 is in operative communication with the power management module 310 and the power management module 310 controls the operation of the inertial sensor 360.

The power management module 310 is configured to activate the axle generator 524 and/or the hub generator 526 when the deceleration is greater than a selected deceleration, which may indicate that some propulsion motor 320 rotation is no longer needed to drive the vehicle 102 and it is a good time to bleed off some rotational energy of the wheels 364 or axle 365 of the transportation system 100 using the axle generator 524 and/or the hub generator 526. Bleeding off rotational energy of the wheels 364 or axle 365 when the vehicle 102 is decelerating helps reduce any performance impact to the ability of the propulsion motor 320 to power the vehicle 102.

The inertial sensor 360 is also configured to detect a pitch angle of the vehicle 102. The power management module 310 is configured to activate the axle generator 524 and/or the hub generator 526 when the when the pitch angle is less than a selected pitch angle, which may indicate that some propulsion motor 320 rotation is no longer needed to drive the vehicle 102 and it is a good time to bleed off some rotational energy of the wheels 364 or axle 365 of the transportation system 100 using the axle generator 524 and/or the hub generator 526. For example, when the vehicle 102 is descending downhill with a negative pitch angle, gravity assists in driving the vehicle 102 downhill and the full capacity of the e rotational energy of the wheels 364 and axle 365 may no longer be needed to drive the vehicle 102. Bleeding off rotational energy of the wheels 364 or axle 365 when the vehicle 102 is descending downhill helps reduce any performance impact to the ability of the propulsion motor 320 to power the vehicle 102.

The axle generator 524 and/or the hub generator 526 may also include a rotational velocity sensor 360a configured to measure the rotational velocity of the electric generation device (e.g., rotations per minute (RPM)). The rotational velocity sensor 360a is in communication with the power management module 310 and the power management module 310 may control the operation of the rotational velocity sensor 360a. The power management module 310 is configured to determine when the vehicle 102 is decelerating utilizing the inertial sensor 360 and/or the rotational velocity sensor 360a, which may indicate that some propulsion motor 320 rotation is no longer needed to drive the vehicle 102 (i.e., the vehicle 102 is going downhill or decelerating) and it is a good time to bleed off some rotational energy of the wheels 364 or axle 365 of the transportation system 100 using the axle generator 524 and/or the hub generator 526. Bleeding off rotational energy of the wheels 364 or axle 365 when the vehicle 102 is decelerating or going downhill helps reduce any performance impact to the ability of the propulsion motor 320 to power the vehicle 102.

In one embodiment, the rotational velocity sensor 360a may be a sensor mechanically connected to the generator 524, 526 to detect rotational velocity of the generator 524, 526. In another embodiment, the rotational velocity sensor 360a may be an electronic sensor electrically connected to the generator 524, 526 to detect rotational velocity of the generator 524, 526 by measuring the electrical frequency output of the generator 524, 526. In another embodiment, the rotational velocity sensor 360a may be an inverter connected to the generator 524, 526 to detect rotational velocity of the generator 524, 526 by measuring the electrical frequency output of the electric generation device 540. In yet another embodiment, the rotational velocity sensor 360a may be a wireless sensor capable of detecting rotational velocity of the generator 524, 526 wirelessly, such as, for example, RFID tracking, wireless capacitive sensor, wireless electromagnetic induction sensor, or any other wireless detection method known to one of skill in the art.

FIGS. 3-9 depict electrical power architectures according to various embodiments. FIGS. 3-9 depict various transport refrigeration unit loads having electrical characteristics. The transport refrigeration system loads include, but are not limited to, one or more of the electric motor 26 for the compression device 32, the drive motor 42 for the fan 40 associated with the refrigerant heat rejection heat exchanger 34, and the drive motor 46 for the fan 44 associated with the refrigerant heat absorption heat exchanger 38, the heater 48 and the controller 30.

Figure 3:
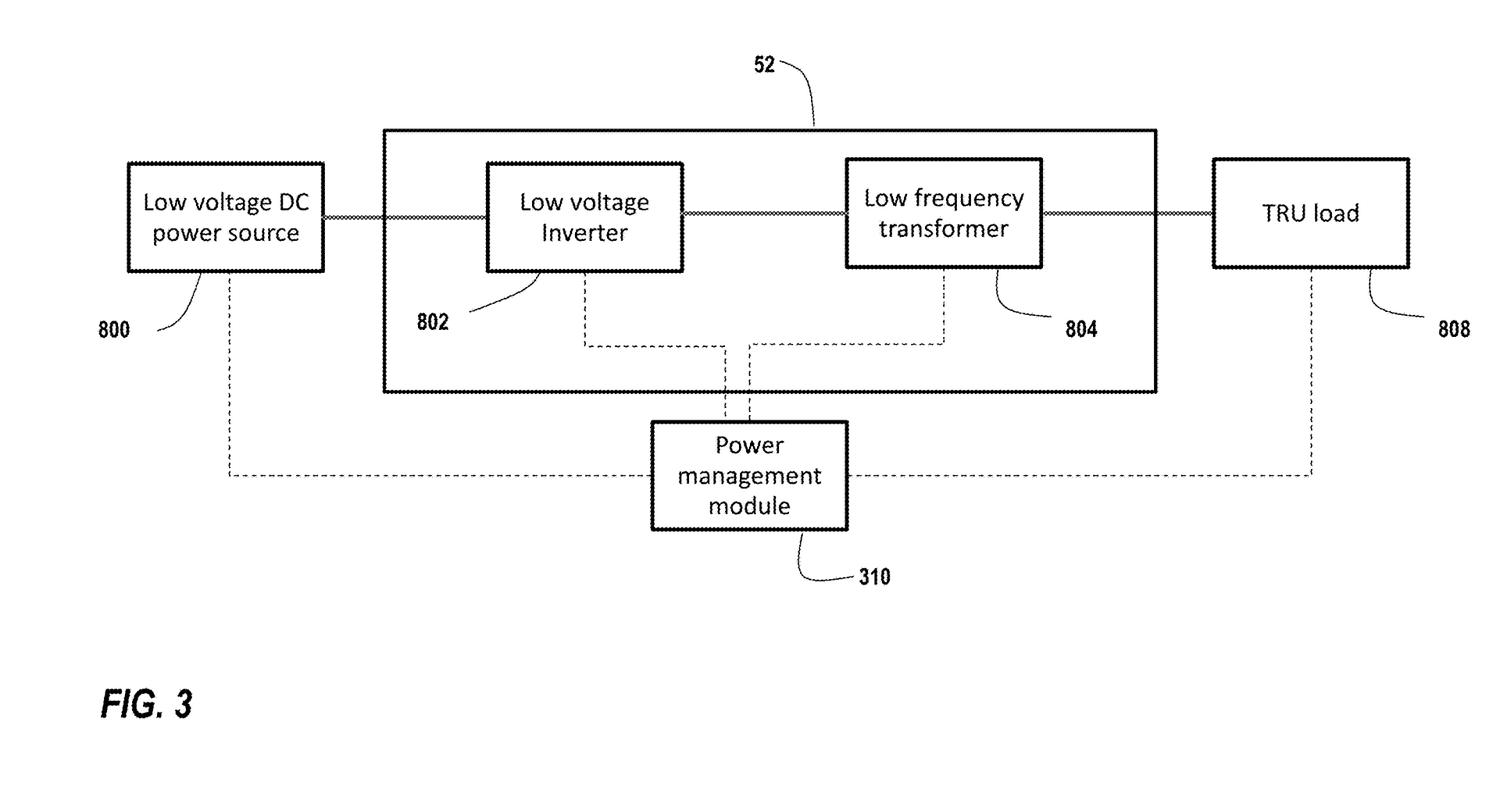
FIG. 3 depicts an electrical power architecture according to an embodiment of the present disclosure.

FIG. 3 depicts an electrical power architecture according to an embodiment of the present disclosure. The electrical architecture is arranged to power the transport refrigeration system 200 using a low voltage DC power source 800. The low voltage DC power source 800 may include one or more of the fuel cell 400, the energy storage devices 510 and the electric generation devices 520. The fuel cell 400, the energy storage devices 510 and the electric generation devices 520 provide DC power, which simplifies combining the outputs of the fuel cell 400, the energy storage devices 510 and the electric generation devices 520.

Power from the low voltage DC power source 800 is supplied to the power converter 52. In an embodiment, the low voltage DC power source 800 provides a DC output of less than 50 volts DC, with a nominal DC output of 48 volts. The output of the low voltage DC power source 800 is connected (e.g., directly) to an input of a low voltage inverter 802 of the power converter 52. The low voltage inverter 802 converts the DC output of the low voltage power source 800 to a low voltage (e.g., less than 50 volts) AC output having a low frequency (e.g., 50 or 60 Hz). The output of the low voltage inverter 802 is connected (e.g., directly) to an input of a low frequency transformer 804 (e.g., 50 or 60 Hz) of the power converter 52. The low frequency transformer 804 steps up the output of the low voltage inverter 802). The output of the low frequency transformer 804 is connected (e.g., directly) to a transport refrigeration unit load 808. In the embodiment of FIG. 3, the transport refrigeration unit load 808 includes all, low voltage, AC powered load(s).

The power management module 310 may sense conditions (e.g., via sensors) at one or more of the elements of FIG. 3 and provide control signals to the low voltage DC power source 800, components of the power converter 52, and/or the transport refrigeration unit load 808 to ensure proper operation of the transport refrigeration system 200 in various operating modes. Example operating modes of the transport refrigeration system 200 include: 1) startup, 2) shut down, 3) start/stop operation, 4) continuous operation, 5) defrost, 6) heating, among other operating modes. The power management module 310 adjusts to those operating modes and signals the low voltage DC power source 800 to operate in the most efficient way.

Figure 4:
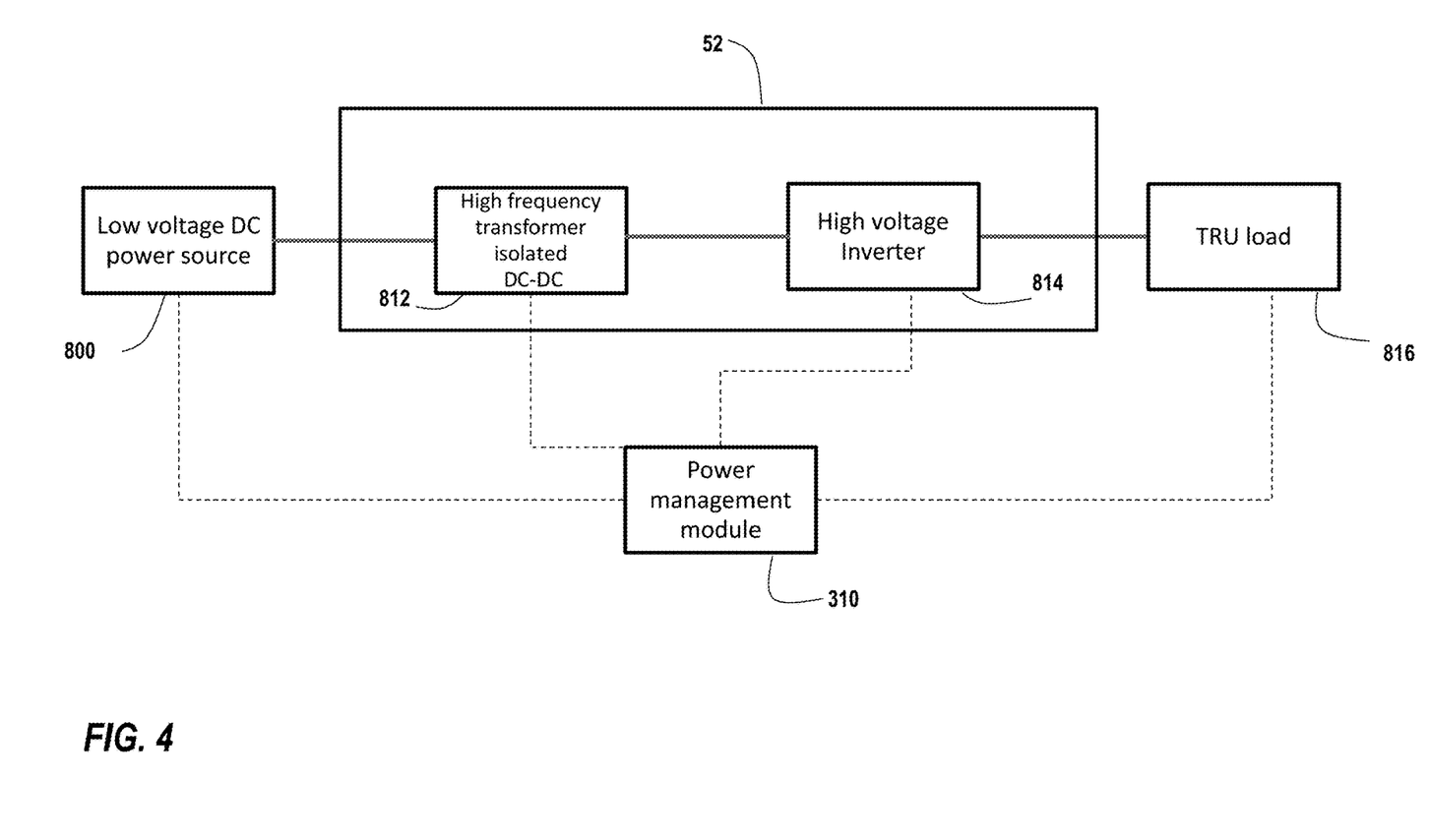
FIG. 4 depicts an electrical power architecture according to an embodiment of the present disclosure.

FIG. 4 depicts an electrical power architecture according to an embodiment of the present disclosure. The electrical architecture is arranged to power the transport refrigeration system 200 using a low voltage DC power source 800. The low voltage DC power source 800 may include one or more of the fuel cell 400, the energy storage devices 510 and the electric generation devices 520. The fuel cell 400, the energy storage devices 510 and the electric generation devices 520 provide DC power, which simplifies combining the outputs of the fuel cell 400, the energy storage devices 510 and the electric generation devices 520.

Power from the low voltage DC power source 800 is supplied to the power converter 52. In an embodiment, the low voltage DC power source 800 provides a DC output of less than 50 volts DC, with a nominal DC output of 48 volts. The output of the low voltage DC power source 800 is connected (e.g., directly) to an input of a high frequency, transformer isolated (e.g., 1 kHz to 10s of kHz) DC-DC converter 812 of the power converter 52. The DC-DC converter 812 converts the DC output of the low voltage power source 800 to a high voltage DC voltage (e.g., hundreds of volts). The output of the DC-DC converter 812 is connected (e.g., directly or through a filter) to an input of a high voltage inverter 814 of the power converter 52. The output of the high voltage inverter 814 is high voltage, AC power (e.g., 400-500 VAC). The output of the high voltage inverter 814 is connected (e.g., directly or through filter such as a sine filter) to a transport refrigeration unit load 816. The high voltage inverter 814 may be a variable frequency inverter under control of the power management module 310, to provide a variable frequency drive. In the embodiment of FIG. 4, the transport refrigeration unit load 816 includes all high voltage, AC powered load(s) and other loads (e.g., 12V battery) that may be powered from this high voltage AC power with additional voltage conversion.

The power management module 310 may sense conditions (e.g., via sensors) at one or more of the elements of FIG. 4 and provide control signals to the low voltage DC power source 800, components of the power converter 52, and/or the transport refrigeration unit load 816 to ensure proper operation of the transport refrigeration system 200 in various operating modes. Example operating modes of the transport refrigeration system 200 include: 1) startup, 2) shut down, 3) start/stop operation, 4) continuous operation, 5) defrost, 6) heating, among other operating modes. The power management module 310 adjusts to those operating modes and signals the low voltage DC power source 800 to operate in the most efficient way.

Figure 5:
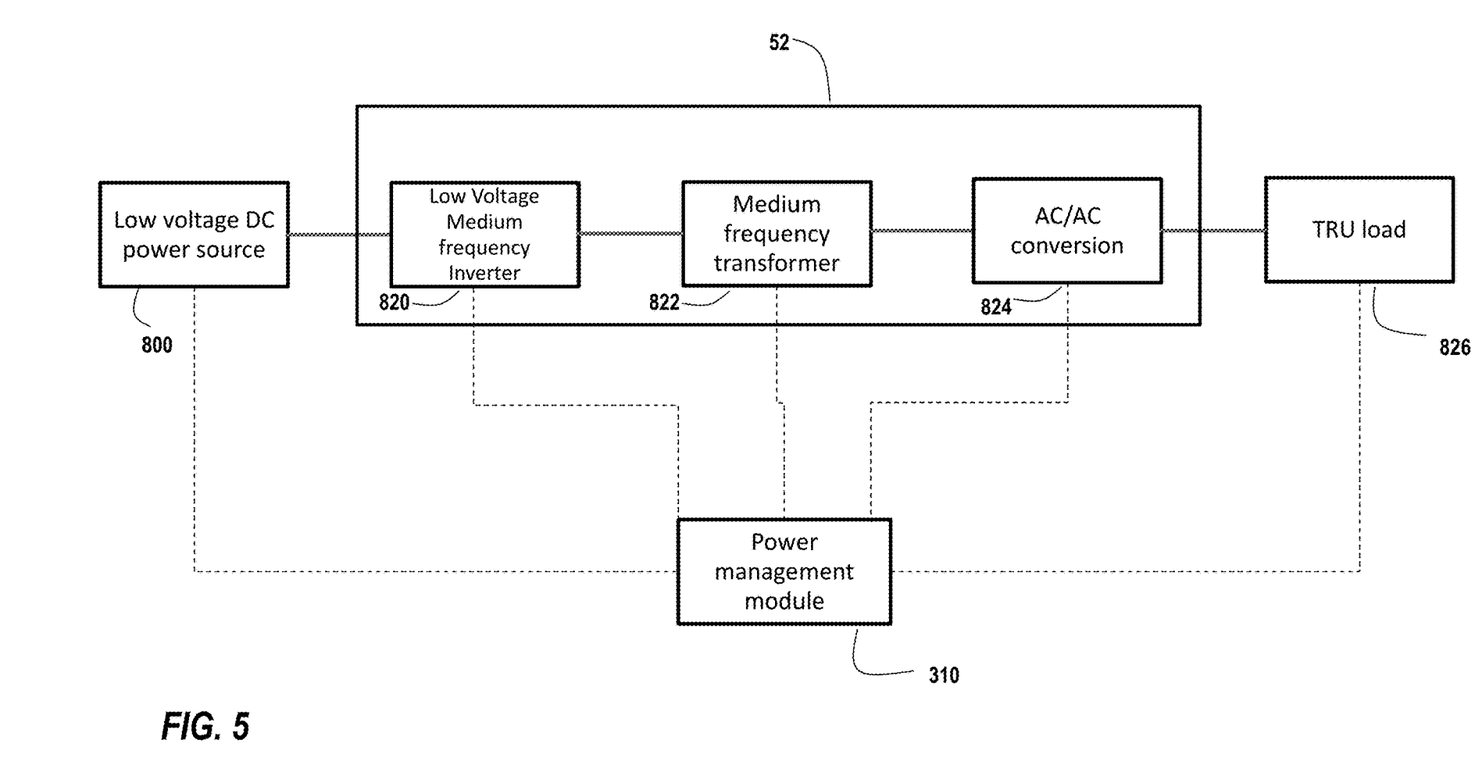
FIG. 5 depicts an electrical power architecture according to an embodiment of the present disclosure.

FIG. 5 depicts an electrical power architecture according to an embodiment of the present disclosure. The electrical architecture is arranged to power the transport refrigeration system 200 using a low voltage DC power source 800. The low voltage DC power source 800 may include one or more of the fuel cell 400, the energy storage devices 510 and the electric generation devices 520. The fuel cell 400, the energy storage devices 510 and the electric generation devices 520 provide DC power, which simplifies combining the outputs of the fuel cell 400, the energy storage devices 510 and the electric generation devices 520.

Power from the low voltage DC power source 800 is supplied to the power converter 52. In an embodiment, the low voltage DC power source 800 provides a DC output of less than 50 volts DC, with a nominal DC output of 48 volts. The output of the low voltage DC power source 800 is connected (e.g., directly) to an input of a low voltage, medium frequency (e.g., 100s of Hz), inverter 820 of the power converter 52. The inverter 820 converts the DC output of the low voltage power source 800 to a low voltage, AC output. The output of the inverter 820 is connected (e.g., directly) to an input of a medium frequency transformer 822 of the power converter 52. The medium frequency transformer 822 steps up the output of the inverter 820. The output of the transformer 822 is connected (e.g., directly) to an input of an AC-AC converter 824 of the power converter 52. The output of the AC-AC converter 824 is high voltage and low frequency (e.g., sine wave) that compatible with transport refrigeration unit load. The output of the AC-AC converter 824 is connected (e.g., directly) to a transport refrigeration unit load 826. In the embodiment of FIG. 5, the transport refrigeration system load 826 includes all high voltage, AC powered load(s) and other loads (e.g., 12V battery) that may be powered from this high voltage AC power with additional voltage conversion.

The power management module 310 may sense conditions (e.g., via sensors) at one or more of the elements of FIG. 5 and provide control signals to the low voltage DC power source 800, components of the power converter 52, and/or the transport refrigeration unit load 826 to ensure proper operation of the transport refrigeration system 200 in various operating modes. Example operating modes of the transport refrigeration system 200 include: 1) startup, 2) shut down, 3) start/stop operation, 4) continuous operation, 5) defrost, 6) heating, among other operating modes. The power management module 310 adjusts to those operating modes and signals the low voltage DC power source 800 to operate in the most efficient way.

Figure 6:
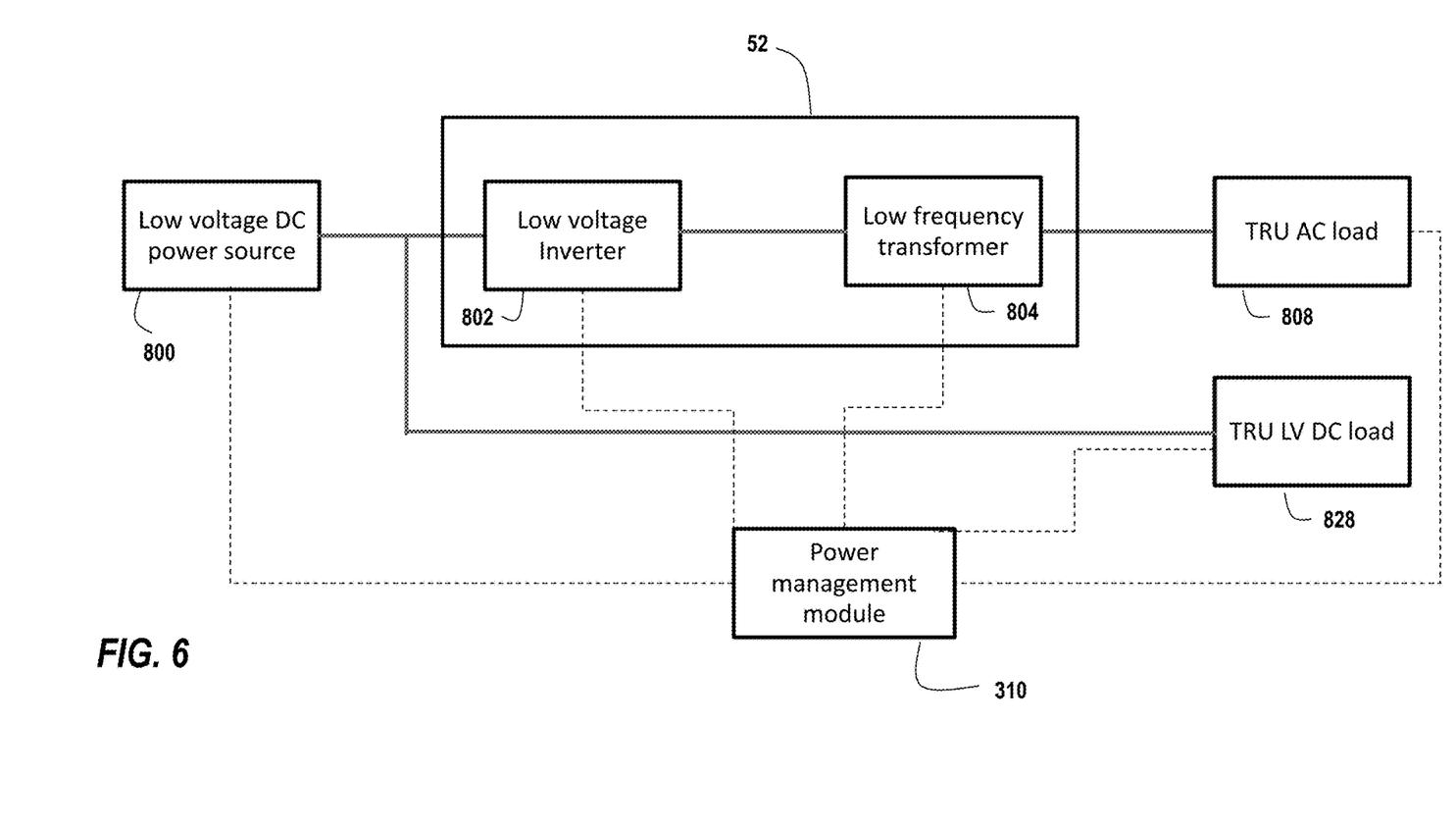
FIG. 6 depicts an electrical power architecture according to an embodiment of the present disclosure.

FIG. 6 depicts an electrical power architecture according to an embodiment of the present disclosure. The electrical architecture is arranged to power the transport refrigeration system 200 using a low voltage DC power source 800. The low voltage DC power source 800 may include one or more of the fuel cell 400, the energy storage devices 510 and the electric generation devices 520. The fuel cell 400, the energy storage devices 510 and the electric generation devices 520 provide DC power, which simplifies combining the outputs of the fuel cell 400, the energy storage devices 510 and the electric generation devices 520.

Power from the low voltage DC power source 800 is supplied to the power converter 52. In an embodiment, the low voltage DC power source 800 provides a DC output of less than 50 volts DC, with a nominal DC output of 48 volts. The output of the low voltage DC power source 800 is connected (e.g., directly) to an input of a low voltage inverter 802 of the power converter 52. The low voltage inverter 802 converts the DC output of the low voltage power source 800 to a low voltage AC output having a low frequency (e.g., 50 or 60 Hz). The output of the low voltage inverter 802 is connected (e.g., directly) to an input of a low frequency transformer 804 (e.g., 50 or 60 Hz) of the power converter 52. The low frequency transformer 804 steps up the output of the low voltage inverter 802. The output of the low frequency transformer 804 is connected (e.g., directly) to a transport refrigeration unit load 808. In the embodiment of FIG. 6, the transport refrigeration unit load 808 includes all, high voltage, AC powered load(s).

The output of the low voltage DC power source 800 is also connected (e.g., directly) to a transport refrigeration unit load 828. In the embodiment of FIG. 6, the transport refrigeration unit load 828 includes all, low voltage, DC powered load(s).

The power management module 310 may sense conditions (e.g., via sensors) at one or more of the elements of FIG. 3 and provide control signals to the low voltage DC power source 800, components of the power converter 52, and/or the transport refrigeration unit loads 808 and 828 to ensure proper operation of the transport refrigeration system 200 in various operating modes. Example operating modes of the transport refrigeration system 200 include: 1) startup, 2) shut down, 3) start/stop operation, 4) continuous operation, 5) defrost, 6) heating, among other operating modes. The power management module 310 adjusts to those operating modes and signals the low voltage DC power source 800 to operate in the most efficient way.

Figure 7:
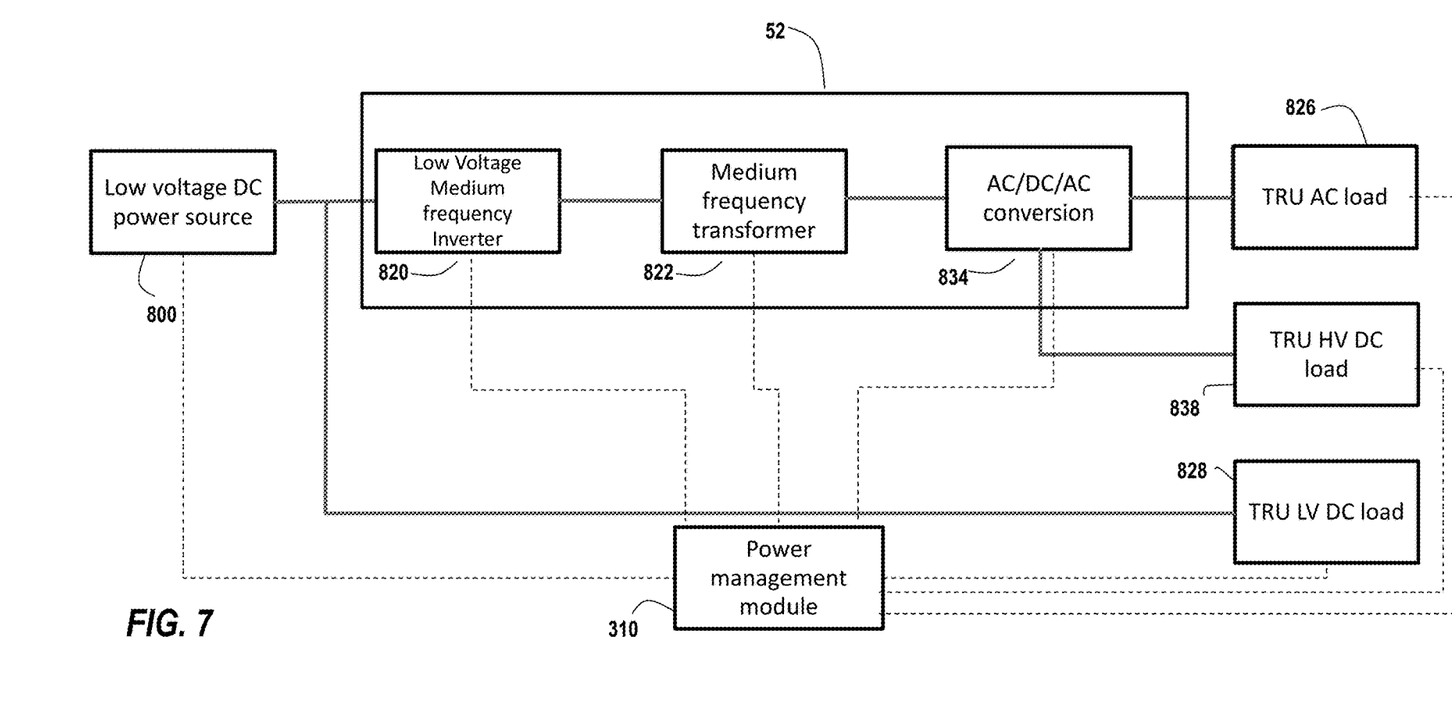
FIG. 7 depicts an electrical power architecture according to an embodiment of the present disclosure.

FIG. 7 depicts an electrical power architecture according to an embodiment of the present disclosure. The electrical architecture is arranged to power the transport refrigeration system 200 using a low voltage DC power source 800. The low voltage DC power source 800 may include one or more of the fuel cell 400, the energy storage devices 510 and the electric generation devices 520. The fuel cell 400, the energy storage devices 510 and the electric generation devices 520 provide DC power, which simplifies combining the outputs of the fuel cell 400, the energy storage devices 510 and the electric generation devices 520.

Power from the low voltage DC power source 800 is supplied to the power converter 52. In an embodiment, the low voltage DC power source 800 provides a DC output of less than 50 volts DC, with a nominal DC output of 48 volts. The output of the low voltage DC power source 800 is connected (e.g., directly) to an input of a low voltage, medium frequency (e.g., 100s of Hz), inverter 820 of the power converter 52. The inverter 820 converts the DC output of the low voltage power source 800 to a low voltage, AC output. The output of the inverter 820 is connected (e.g., directly) to an input of a medium frequency transformer 822 of the power converter 52. The medium frequency transformer 822 steps up the output of the inverter 822. The output of the transformer 822 is connected (e.g., directly) to an input of an AC/DC/AC converter 834 of the power converter 52. A first output of the AC/DC/AC converter 834 is high voltage, low frequency. The first output of the AC/DC/AC converter 834 is connected (e.g., directly) to a transport refrigeration unit load 826. In the embodiment of FIG. 5, the transport refrigeration unit load 826 includes all high voltage, AC powered load(s).

A second output of the AC/DC/AC converter 834 is high voltage (e.g., hundreds of volts) DC power. The second output of the AC/DC/AC converter 834 is connected (e.g., directly) to a transport refrigeration unit load 838. In the embodiment of FIG. 7, the transport refrigeration unit load 838 includes all, high voltage, DC powered load(s).

The output of the low voltage DC power source 800 is also connected (e.g., directly) to a transport refrigeration unit load 828. In the embodiment of FIG. 7, the transport refrigeration unit load 828 includes all, low voltage, DC powered load(s).

The power management module 310 may sense conditions (e.g., via sensors) at one or more of the elements of FIG. 7 and provide control signals to the low voltage DC power source 800, components of the power converter 52, and/or the transport refrigeration system loads 826, 838 and 828 to ensure proper operation of the transport refrigeration system 200 in various operating modes. Example operating modes of the transport refrigeration system 200 include: 1) startup, 2) shut down, 3) start/stop operation, 4) continuous operation, 5) defrost, 6) heating, among other operating modes. The power management module 310 adjusts to those operating modes and signals the low voltage DC power source 800 to operate in the most efficient way.

Figure 8:
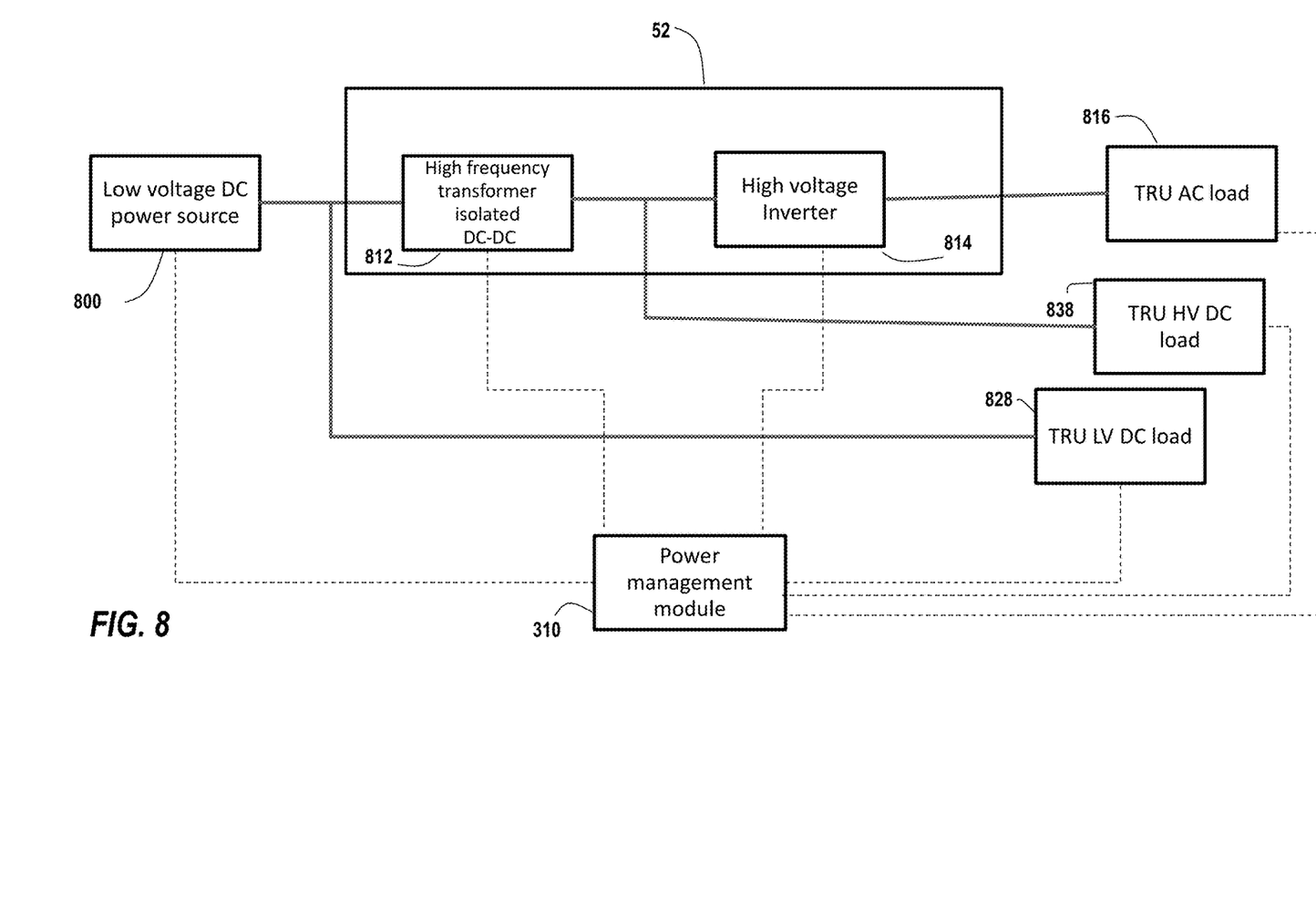
FIG. 8 depicts an electrical power architecture according to an embodiment of the present disclosure.

FIG. 8 depicts an electrical power architecture according to an embodiment of the present disclosure. The electrical architecture is arranged to power the transport refrigeration system 200 using a low voltage DC power source 800. The low voltage DC power source 800 may include one or more of the fuel cell 400, the energy storage devices 510 and the electric generation devices 520. The fuel cell 400, the energy storage devices 510 and the electric generation devices 520 provide DC power, which simplifies combining the outputs of the fuel cell 400, the energy storage devices 510 and the electric generation devices 520.

Power from the low voltage DC power source 800 is supplied to the power converter 52. In an embodiment, the low voltage DC power source 800 provides a DC output of less than 50 volts DC, with a nominal DC output of 48 volts. The output of the low voltage DC power source 800 is connected (e.g., directly) to an input of a high frequency, transformer isolated (e.g., 1 kHz to 10s of kHz), DC-DC converter 812 of the power converter 52. The DC-DC converter 812 converts the DC output of the low voltage power source 800 to a high voltage DC voltage (e.g., hundreds of volts). The output of the DC-DC converter 812 is connected (e.g., directly) to an input of a high voltage inverter 814 of the power converter 52. The output of the high voltage inverter 814 is high voltage, AC power (e.g., 400-500 VAC). The output of the high voltage inverter 814 is connected (e.g., directly) to a transport refrigeration unit load 816. In the embodiment of FIG. 8, the transport refrigeration unit load 816 includes all high voltage, AC powered load(s).

The output of the DC-DC converter 812 is also connected (e.g., directly) to a transport refrigeration unit load 838. In the embodiment of FIG. 8, the transport refrigeration unit load 838 includes all, high voltage, DC powered load(s).

The output of the low voltage DC power source 800 is also connected (e.g., directly or indirectly with additional power conversion) to a transport refrigeration unit load 828. In the embodiment of FIG. 8, the transport refrigeration unit load 828 includes all, low voltage, DC powered load(s). A DC-DC converter may be used to convert the voltage from the low voltage DC power source 800 (e.g., 48VDC) to a suitable DC load voltage (e.g., 24 VDC or 12 VDC).

The power management module 310 may sense conditions (e.g., via sensors) at one or more of the elements of FIG. 8 and provide control signals to the low voltage DC power source 800, components of the power converter 52, and/or the transport refrigeration unit loads 816, 838 and 828, to ensure proper operation of the transport refrigeration system 200 in various operating modes. Example operating modes of the transport refrigeration system 200 include: 1) startup, 2) shut down, 3) start/stop operation, 4) continuous operation, 5) defrost, 6) heating, among other operating modes. The power management module 310 adjusts to those operating modes and signals the low voltage DC power source 800 to operate in the most efficient way.

Figure 9:
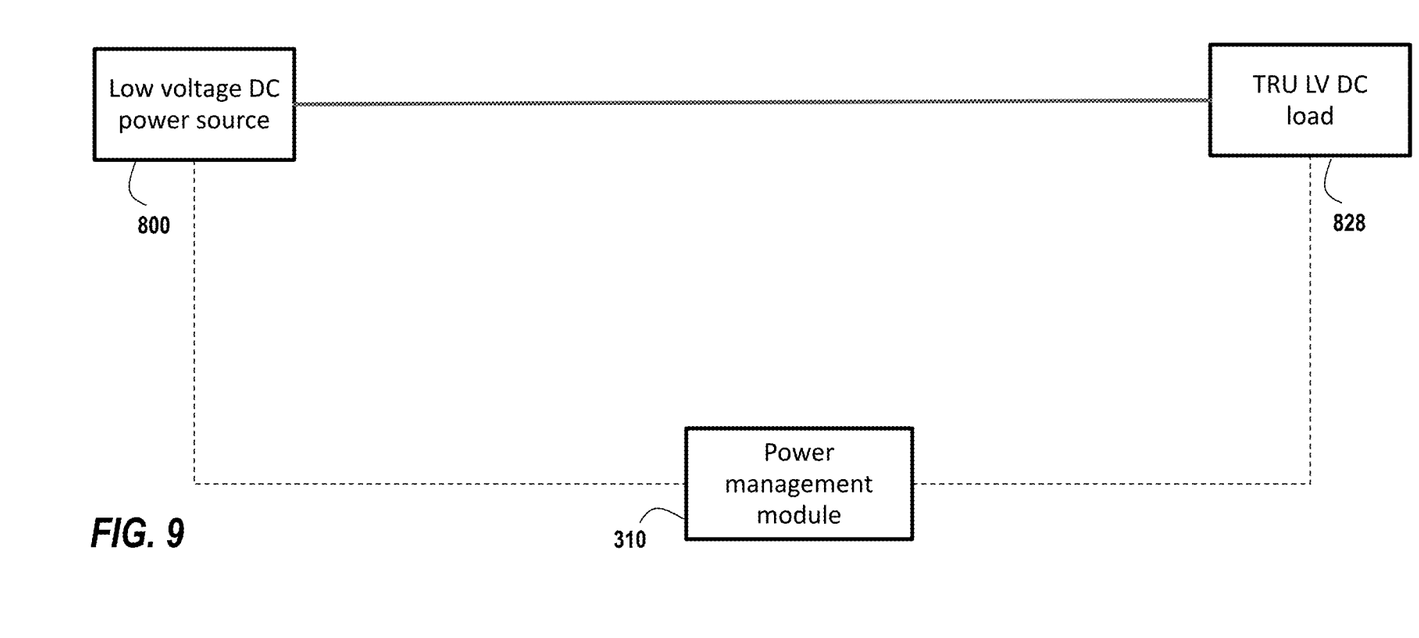
FIG. 9 depicts an electrical power architecture according to an embodiment of the present disclosure.

FIG. 9 depicts an electrical power architecture according to an embodiment of the present disclosure. The electrical architecture is arranged to power the transport refrigeration system 200 using a low voltage DC power source 800. The low voltage DC power source 800 may include one or more of the fuel cell 400, the energy storage devices 510 and the electric generation devices 520. The fuel cell 400, the energy storage devices 510 and the electric generation devices 520 provide DC power, which simplifies combining the outputs of the fuel cell 400, the energy storage devices 510 and the electric generation devices 520.

Power from the low voltage DC power source 800 is supplied (e.g., directly) to a transport refrigeration unit load 808. In the embodiment of FIG. 9, the transport refrigeration unit load 808 includes all, low voltage, DC powered load(s). In one embodiment, the low voltage DC power source 800 is a fuel cell that directly provides power to a 48VDC motor that drives mechanically a reciprocal compressor that is semi-hermetically-sealed. In another embodiment, the low voltage DC power source 800 is a fuel cell that directly provides power to a hermetically-sealed compressor that uses a 48VDC motor.

In example embodiments, the nominal voltage of the compressor is motor is 48V, but may operate over a range of voltages from 24 to about 56 VDC. Such motors have their own inverter, that can also be water cooled to keep the motor compact. The motor is capable of generating up to about 12 kW of continuous power, but for short times it could generate as much as 30 kW power. More preferably, the motor produces up to 18 kW of continuous power. Most preferable the motor produces up to 22 kW of continuous power. The controls of the motor takes input from 12V or 24V. The 48VDC motor can also drive an alternator to generate AC power for other system components in the transport refrigeration unit, which may utilize a clutch to engage. The power management module 310 controls may control the motor over a CAN-bus.

The power management module 310 may sense conditions (e.g., via sensors) at one or more of the elements of FIG. 9 and provide control signals to the low voltage DC power source 800 and/or the transport refrigeration system load 828 to ensure proper operation of the transport refrigeration system 200 in various operating modes. Example operating modes of the transport refrigeration system 200 are: 1) startup, 2) shut down, 3) start/stop operation, 4) continuous operation, 5) defrost, 6) heating, among other operating modes. The power management module 310 adjusts to those operating modes and signals the low voltage DC power source 800 to operate in the most efficient way.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
   a transport refrigeration unit configured to provide conditioned air to a refrigerated cargo space of a container;
   a low voltage DC power source configured to provide electricity to the transport refrigeration unit;
   a power converter configured to condition DC power from the low voltage DC power source prior to supply to a transport refrigeration unit load; and
   a power management module configured to manage power provided to the transport refrigeration unit;
   wherein the power converter comprises:
   a low voltage, medium frequency inverter connected to an output of the low voltage DC power source;
   a medium frequency transformer connected to an output of the low voltage, medium frequency inverter;
   an AC/DC/AC converter connected to an output of the medium frequency transformer;
   an AC output of the AC/DC/AC converter connected to the transport refrigeration unit load;
   a DC output of the AC/DC/AC converter connected to a DC second transport refrigeration unit load;
   an output of the low voltage DC power source directly connected to a DC third transport refrigeration unit load.

2. The transport refrigeration system of claim 1, wherein the low voltage DC power source includes one or more supplemental power sources configured to provide supplemental electricity to the transport refrigeration unit.

3. The transport refrigeration system of claim 2, wherein the one or more supplemental power sources comprises:
   an energy storage device configured to store electricity and provide electricity to the transport refrigeration unit; and
   an electric generation device configured to generate electricity and provide the electricity to the transport refrigeration unit.

4. The transport refrigeration system of claim 2, wherein the one or more supplemental power sources comprises an energy storage device configured to store electricity and provide electricity to the transport refrigeration unit.

5. The transport refrigeration system of claim 4, wherein the energy storage device comprises at least one of a battery system, a capacitor, or a thermal storage system.

6. The transport refrigeration system of claim 2, wherein the one or more supplemental power sources comprises an electric generation device configured to generate electricity and provide the electricity to the transport refrigeration unit.

7. The transport refrigeration system of claim 6, wherein the electric generation device comprises at least one of a small assist internal combustion engine generator, an axle generator, a hub generator or a solar panel.

8. The transport refrigeration system of claim 1, wherein the low voltage DC power source comprises a fuel cell.

9. A transport refrigeration system comprising:
   a transport refrigeration unit configured to provide conditioned air to a refrigerated cargo space of a container, the transport refrigeration unit having a transport refrigeration unit load;
   a low voltage DC power source configured to provide electricity to the transport refrigeration unit;
   wherein the low voltage DC power source is directly connected to the transport refrigeration unit load;
   wherein the low voltage DC power source has a voltage matching an input voltage required at the transport refrigeration unit load.

10. The transport refrigeration system of claim 9, wherein the low voltage DC power source comprises a fuel cell.

* * * * *